April 11, 1961 L. E. ERICKSON 2,979,187
APPARATUS FOR CONVEYING MATERIAL
Original Filed Feb. 6, 1952 2 Sheets-Sheet 1
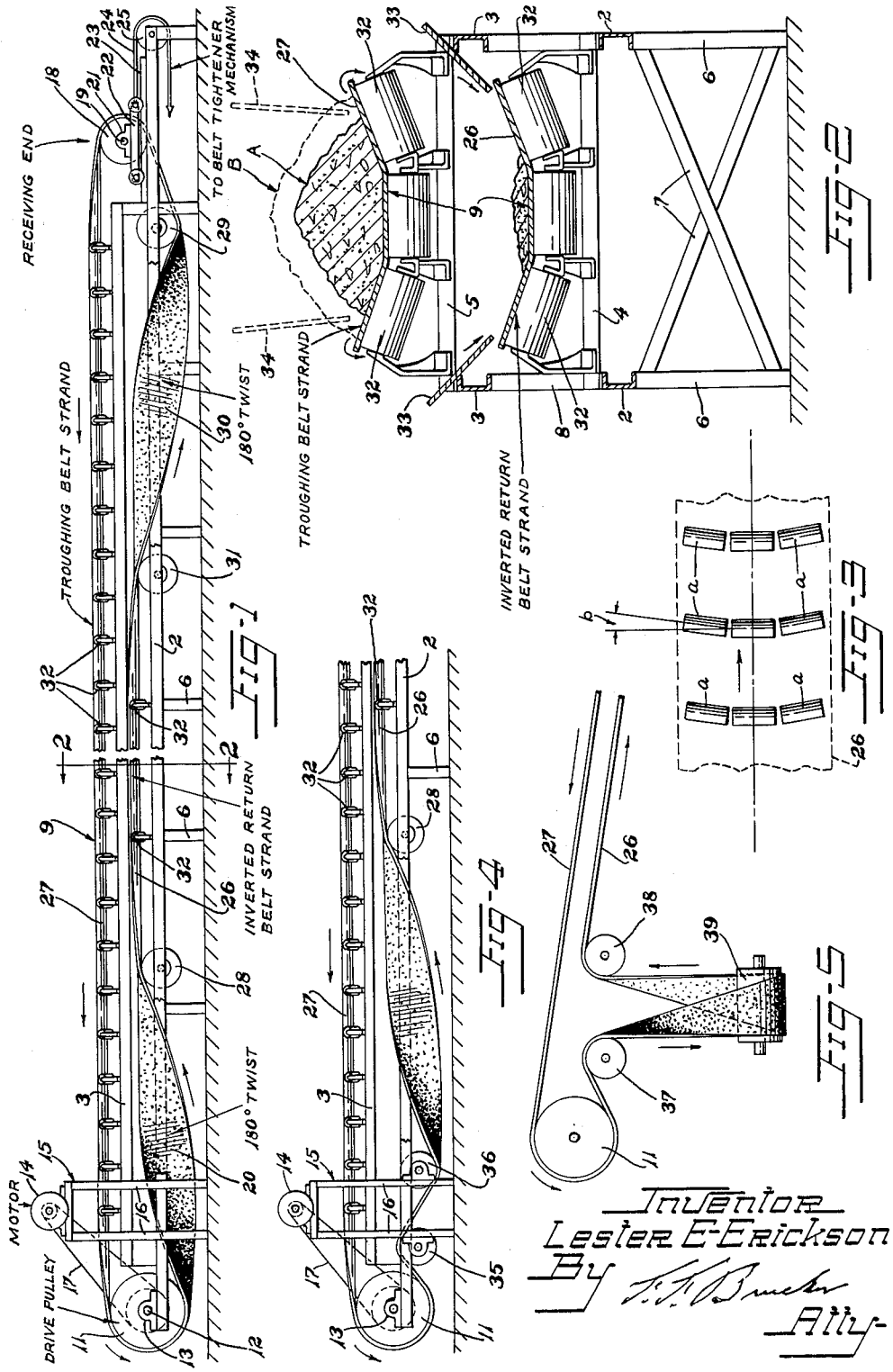

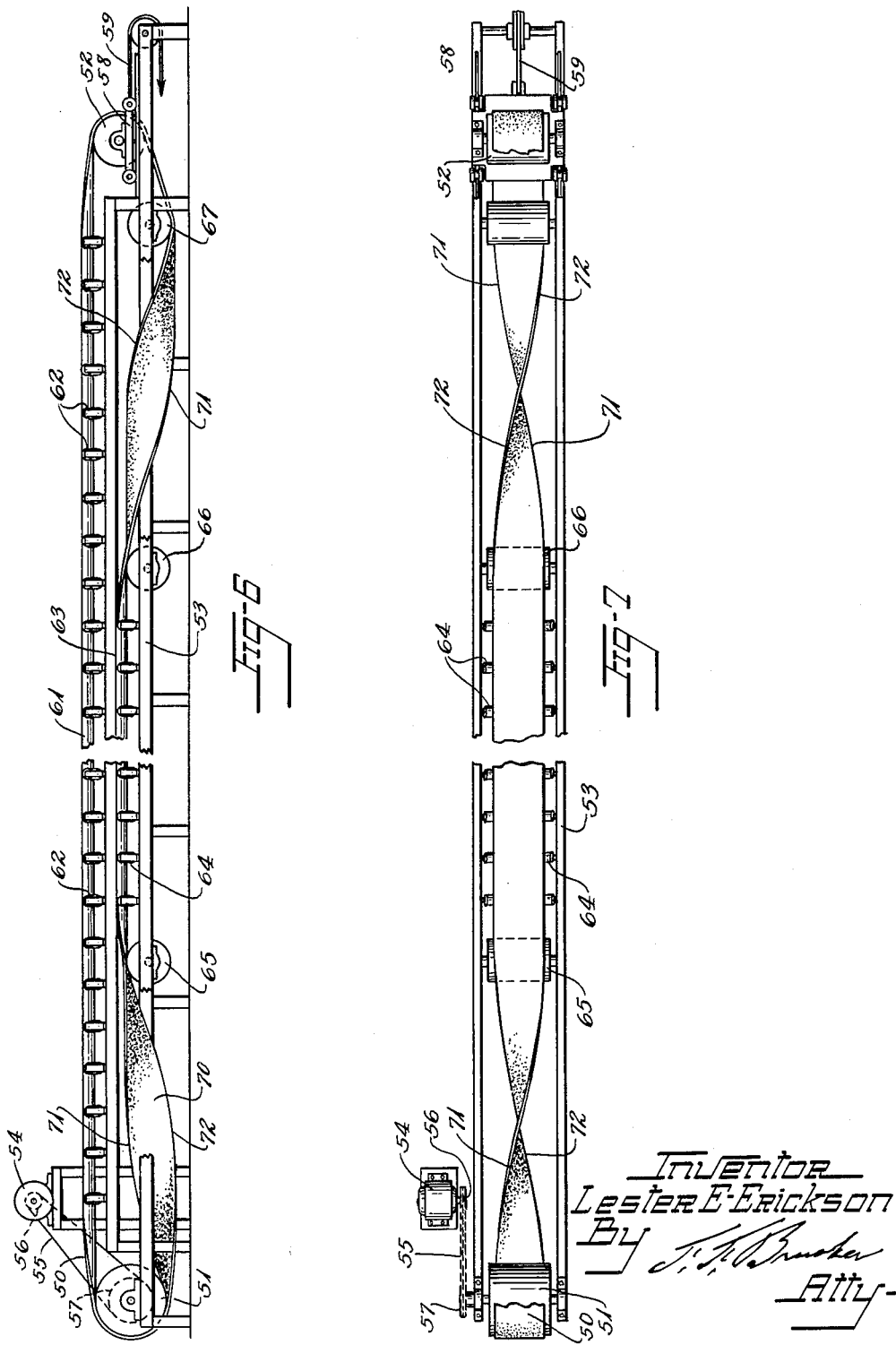

United States Patent Office 2,979,187
Patented Apr. 11, 1961

2,979,187

APPARATUS FOR CONVEYING MATERIAL

Lester E. Erickson, Duluth, Minn., assignor to The B. F. Goodrich Company, New York, N.Y., a corporation of New York Continuation of application Ser. No. 270,175, Feb. 6, 1952. This application June 20, 1958, Ser. No. 743,368

1 Claim. (Cl. 198—184)

This invention relates to apparatus for conveying materials and is particularly useful in conveying raw materials in bulk form from place to place by the use of flexible conveyor belts. This application is a continuation of my application Serial No. 270,175, filed February 6, 1952, and which in turn was a continuation in part of my application Serial No. 226,658, filed May 16, 1951, and entitled "Heavy Duty Conveyor." Both of these applications are now abandoned.

In many industries it is necessary to convey bulk materials such as clay, ore, coals, broken or crushed rock and other materials for great distances by use of belt conveyors.

Ordinarily, such conveyors have been made up of an endless flat conveyor belt of considerable width trained about a driving pulley at one end of the run of the conveyor and an idler pulley, which usually has had means for adjusting its position to tension the belt, at the opposite end of the belt run. The upper reach of the belt ordinarily has been used to carry the material and ordinarily has been supported at intervals by troughing rollers to present a load carrying face of concave cross section, whereas the return reach of the belt normally has been beneath the load-carrying reach and has not carried material but has been supported at intervals by straight idler rollers. Additional snubbing and guide pulleys have also been present in many instances in the ordinary belt conveyor apparatus.

Conveyor belts used for this purpose have usually been constructed of many layers of woven fabric or cords or both enclosed in a wear-resisting cover of vulcanized rubber or similar vulcanizable material. As the material conveyed had ordinarily been carried only by the upper or load-contacting face of the belt, the wear-resisting covering of that face has ordinarily been made thicker than the covering on the pulley contacting face of the belt to resist greater wear. As the covering of the pulley-contacting face of the belt has ordinarily been relatively thin it could not be used sucessfully over long periods of time to support material to be conveyed but was intended merely for resisting wear resulting from contact with the pulleys.

In the loading of the ordinary conveyor belt apparatus some overflow of the material from the load-carrying reach is likely to occur, and this may either drop directly onto the return reach of the belt or may be deflected thereto from the stationary frame members of the apparatus. In either event, the spilled material, unless removed, will be carried between the belt and its supporting and driving pulleys, with resultant damage to both the belt and the pulleys.

In such conventional conveyor apparatus the load carrying face of the conveyor belt must contact the face of the return idler and snubbing pulleys and when such apparatus is used to handle clay and other wet and sticky materials they adhere to the load-carrying face of the belt and are in part transferred to the faces of the return idler and snubber pulleys where it has been necessary to remove them by the use of scrapers or doctor blades.

In some cases, as in mining operations, especially in the mining of open pits the overbearing soil must be handled often in wet condition, and such wet material when spilled on the return flight of the belt may adhere to and build up on the inner surface of the conveyor belt and on its supporting and driving pulleys with resultant damage to the conveyor, or may cause delay in operation due to the fact that the conveyed material in adhering to the belt and pulleys decreases friction and leads to slippage. Provision has accordingly been made in many instances for scraping or brushing away material which builds up between the belt and its pulleys.

The present invention aims to overcome the foregoing and other difficulties and to increase the advantages of belt conveying apparatus. It is therefore an object of the present invention to reduce the deposit of material upon the pulleys contacting face of the belt.

Another object of the invention is to make possible the use of both the delivery and return reaches of the belt for load carrying purposes.

Still another object of the invention is to protect the pulley-contacting face of the belt from contact with the conveyed material.

Another object of the invention is to provide a plurality of twists at spaced-apart positions in the lower reach of the belt to present the load-carrying face uppermost between the twists for load-carrying purposes.

Another object of the invention is to provide a half twist, or 180° twist, of the return reach of the belt at one position thereof and a second half twist, or 180° twist, of the return reach of the belt in the same direction or same hand at another position spaced therefrom to provide a return reach of the belt in which the belt at the centers of the twists stands first and one edge and then on the other, thereby distributing the tension forces between the two margins of the belt and reducing the stress on a single margin.

A further object is to provide an endless belt conveyor comprising a relatively wide heavy duty endless rubber belt having its upper load-carrying reach troughed by a plurality of groups of troughing rollers disposed transversely to the conveyor and arranged in closely spaced relation substantially the length of the conveyor, and means being provided in the construction of the conveyor for inverting the return reach of the belt adjacent to the ends of the conveyor, whereby the pulley-engaging face of the return reach is directed downwardly so that any excess material dropping from the load-carrying reach will engage the load-carrying surface of said lower reach, whereby the material thus precipitated onto the lower reach cannot be brought into engagement with the peripheries of the belt supporting pulleys and interfere with the operation of the belt.

A further object of the invention is to provide an endless belt conveyor of the class described, having means for imparting to the lower reach a one-half twist, whereby the major portion of the length of the return reach is inverted so that its load-carrying surface is directed upwardly, whereby material dropping from the load-carrying reach onto the return cannot engage the pulley-engaging surface of the return reach thereby maintaining the peripheries of the pulleys free of foreign matter, whereby the conveyor may be operated for long periods without servicing.

A further and more specific object of the invention is to provide a conveyor wherein the two reaches of the endless conveyor belt are disposed directly, one over the other, on suitable troughing rollers, skirts or deflectors being arranged between said upper and lower reaches at the sides of the conveyor for inwardly directling onto the lower reach any material which may spill over the edges of the upper reach, whereby the upper belt reach may be loaded to a relatively wider contour, crosswise of the belt, thereby to allow the load-carrying capacity of the conveyor to be increased and to allow the chuck size of the material to be increased, without increasing the structure.

Other objects are to provide for travel of the return reach of the belt with its load-supporting face uppermost, to provide troughing of the return reach of the belt, to provide reversal of position of the belt on its return reach, to reduce wear of the pulley-contacting face of the belt, to reduce tension of the belt, and generally to provide more efficient operation and novel construction.

These and other objects will appear from the following description and the accompanying drawings.

Of the drawings:

Figure 1 is a side elevational view showing an endless belt conveyor with the invention embodied therein, portions of the structure being broken away to illustrate more clearly the construction thereof;

Figure 2 is a cross-sectional view substantially on the line 2—2 of Figure 1 on an enlarged scale, showing the upper and lower reaches of the belt similarly troughed;

Figure 3 is a fragmentary view showing the arrangement of the outer troughing rollers to center the belt reaches;

Figure 4 is a view showing the drive end of a high tension conveyor, wherein snub rollers are interposed between the drive pulley and the adjacent twisted portion of the lower belt reach, thereby to increase the angle of wrap of the belt on the drive pulley;

Figure 5 is a view illustrating another method of inverting the return reach of an endless belt conveyor;

Figure 6 is a view similar to Figure 1 showing another modification of the invention;

Figure 7 is a plan view of the apparatus of Figure 6, the straight upper reach of the belt being broken away to show the lower twisted reach and a portion of the apparatus being broken away.

Referring to Figs. 1, 2 and 4, the novel belt conveyor herein disclosed is shown comprising a structural frame including longitudinally extending side frame members 2 and 3 at each side thereof secured together by cross members 4 and 5, as best illustrated in Figure 2. Upright posts or frame members 6 have their upper ends suitably secured to the lower side rails 2, and transversely disposed diagonal braces 7 may be interposed between the posts 6 at opposite sides of the structure, thereby to reinforce and strengthen the structure. The side rails 3 may be supported on upright frame members 8 interposed between the lower rails 2 and the rails 3, as is well known in structures of this general type. Obviously, the structural supporting frame of the conveyor, as shown in Figures 1 and 2, may be constructed in any suitable manner applicable for the purpose, and whereby it will provide the necessary strength to support the loads to be carried by the conveyor. One of the important features of the present invention resides in the unique arrangement of the endless conveyor belt, generally designated by the numeral 9, which constitutes the load carrying means of the conveyor.

In conveyors used for transporting bulk material, as in the present case, belt 9 is comparatively wide, usually from thirty to thirty-six inches or more, depending upon the material to be handled. The conveyor illustrated in Figure 1 has been found extremely practical and efficient in actual operation, and presents the utmost in simplicity. The belt 9 is supported at one end of the conveyor by a drive pulley 11 of fairly large diameter, preferably secured to a shaft 12 mounted in suitable bearings 13 secured to the lower side rails 2. The pulley 11 may be driven from any suitable source of power. In the present instance, a motor 14 is shown mounted upon a supporting frame 15 having its upright members or legs 16 suitably secured to the horizontal side frame members 2 and 3 by suitable means such as welding. The motor is shown having a belt drive 17 operatively connecting it with the shaft 12 of the drive pulley. The motor may, as is well known in the art, be mounted for sliding movement on the supporting frame 15 for the purpose of taking up slack in the drive belt 17.

The opposite or receiving end of the conveyor is shown having a return idler pulley 18 mounted therein for supporting the conveyor belt at that end of the conveyor. The pulley 18 is preferably secured to a shaft 19 shown mounted in suitable bearings 21 secured to the frame of a suitable carriage 22, mounted for traveling movement toward and from the drive pulley 11 upon suitable tracks 23. A cable 24 is shown having one end secured to the carriage 22 and may pass around an idler 25. The opposite end of the cable 24 may be secured to any suitable tensioning mechanism capable of constantly maintaining the conveyor belt 9 at the proper operating tension. Various forms of belt tensioning apparatus are now available upon the market, and it is therefore believed unnecessary to disclose such a mechanism herein.

In the operation of conveyors of this general type, particularly in the mining industry where the bulk material to be conveyed may frequently be wet, slushy, and sticky, difficulty is often experienced in keeping the belt and its supporting pulleys clean and free of foreign matter. Such matter often accumulates on the peripheries of the pulleys, particularly the pulley 18, and if not frequently removed therefrom, may eventually cause serious damage to the belt and other parts of the equipment.

The present invention provides means for eliminating this difficulty which consists primarily in inverting the lower reach 26 of the belt so that the pulley-engaging surface or side of said return reach is directed downwardly away from the upper load-carrying reach 27, as clearly illustrated in Figure 1.

To invert the major portion of the length of the lower reach 26, a horizontal guide pulley 28 is mounted on the supporting frame a fixed distance from the drive pulley 11. The spacing between the pulley 28 and the drive pulley 11 is determined by the inherent construction of the belt, such as its width, the number of plies, and the ability of the belt to yield and flex, when given a 180° twist as indicated by the belt section 20 in Figure 1.

Satisfactory results have been obtained where the reach of the twisted portion of the belt for a 180° twist was made equal in feet to the width of the belt in inches, in other words for a 30 inch belt, thirty feet was allowed for each 180° twist.

The return belt reach 26 has a similar twisted section 30 at the receiving end of the conveyor, located between guide pulleys 29 and 31, the latter being similar to the pulley 28. Guide pulleys 29 and 31 are so spaced apart that the twisted belt section 30 between pulleys 29 and 31 is equal in length to the belt section 20 at the opposite end of the conveyor, as clearly illustrated in Figure 1. The pulley 29 is spaced inwardly from the idler pulley 18 at the receiving end of the conveyor to provide adequate movement for the pulley 18 in a longitudinal direction to permit adjustment of the belt to the proper operating tension.

Conveyors of the general class herein described are frequently several hundred feet in length, whereby the twisted belt sections 20 and 30 at the ends of the return reaches constitute but an extremely small percentage of the length of said return reaches.

Another important feature of the present invention resides in supporting the inverted return reach 26 on troughing rollers 32, whereby the return reach becomes, in effect, a load-carrying member in a manner similar to the upper reach 27. The upper load-carrying reach 27 is, as is customary, supported on similar troughing rollers 32. It is new, however, so far as is known, to support the return reach 26 of an endless belt conveyor of the class herein disclosed, so that by a simple twist full use may be made of this reach as a material carrying member, in addition to the work done by the upper load-carrying reach 27.

In Figure 2, of the application drawings, the relationship between the upper and lower belt reaches is clearly illustrated. To obtain the maximum benefits of the troughing of the lower reach, suitable skirts or deflectors 33 are provided at the sides of the conveyor and may be suitably supported upon the longitudinally extending side frame members 3 in such a manner as to direct any material spilling over the edges of the upper reach 27 in an inward direction onto the return reach 26, as indicated by the arrows in Figure 2.

By making use of the lower reach as an auxiliary load-carrying member, previous limitations on the amount of the pay load conveyed by the upper load-carrying reach 27 are removed, because in such an installation in accordance with this invention, spillage from the upper reach no longer becomes of any consequence, as all such spillage is directed into the lower reach by the inclined skirts or deflectors 33, as indicated.

Heretofore, it has been a standard practice when loading a conveyor such as herein disclosed, that the load delivered onto the conveyor would not exceed more than approximately two-thirds the width of the belt. For example, in a standard thirty-inch conveyor system, the skirt plates at the loading end of the conveyor are positioned to confine the material as it is delivered onto the belt to a twenty-inch width thereon, such delivery of the material onto the belt being controlled by the usual skirt plates of the loading mechanism, not shown in the drawings. It has been necessary so to load the material onto the belt in order to avoid as much as possible any spillage of the material over the edges of the load-carrying reach.

By utilizing the return reach as an auxiliary material-carrying member, it is now possible to increase materially the load delivered onto the upper load-carrying reach 27 in that the belt may now be loaded to contour B, whereas it has heretofore been necessary to load the belt to contour A, as indicated in Figure 2. To increase the width of the load on the belt cross-sectionally, as indicated at B in Figure 2, was readily accomplished by simply increasing the spacing between the loading skirts 34 to correspond to the relatively wider contour of load B.

In the operation of conveyors of this general type difficulty has sometimes been experienced in maintaining the belts in proper alignment with their supporting pulleys, particularly the lower reach which in conventional conveyors has always been flat in cross-section. This difficulty of misalignment may be completely overcome by slightly inclining the outer rollers *a* of the troughing rollers 32, as indicated at *b* in Figure 3. By thus inclining the outer rollers *a* of each set of troughing rollers of the lower reach 26, said reach is maintained in alignment with its supporting pulleys at all times.

From the foregoing it will be noted that numerous advantages are gained in the operation of a conveying system such as herein disclosed by inverting the lower return reach 26. First, the pulley-engaging side of the reach is inverted relative to the upper load-carrying reach 27, whereby spillage from the upper reach cannot drop onto the pulley-engaging surface of the lower reach, between the guide rollers 28 and 31. In addition, the return reach 26 is converted into a load-carrying reach, whereby any material spilling from the upper reach is conveyed back to the receiving end of the conveyor where it is automatically dumped from the conveyor belt as a result of the half twist 30.

It will also be noted, as hereinbefore stated, that the clean side of the conveyor belt 9 is always in contact with the load-carrying pulleys, and only the opposite side thereof can be exposed to foreign matter such as may be conveyed by the system. By utilizing a minimum of guide pulleys, such as 28, 29 and 31, illustrated in Figure 1, the upper load-carrying reach 27 may be kept comparatively close to the ground level, which is always a highly desirable feature in this type of apparatus. It also reduces to a minimum the movable parts of the conveyor system, whereby the maintenance cost may be reduced to a minimum.

In Figure 4 there is shown the preferred manner of snubbing the lower reach 26 at the drive end of a high tension conveyor in order to increase the wrap of the belt around the drive pulley 11. High tension loads obviously require relatively greater driving contact between the belt and the periphery of the drive pulley and this is accomplished in a system such as shown in Figure 4 by introducing the added snub pulley 35 and guide pulley 36. The provision of the snub pulley 35 and guide pulley 36 does not increase the overall height of the conveyor and makes it possible to obtain the necessary belt wrap around the drive pulley readily and conveniently, to obtain the necessary driving connection between the belt and drive pulley for the relatively heavier load to be conveyed.

Figure 5 illustrates a system wherein the lower reach 26 of the belt is given a half-twist by means of guide pulleys 37 and 38 and an idler pulley 39 disposed at right angles to pulleys 37 and 38 and at a lower elevation. The pulley 39 is supported in a suitable structure, not deemed necessary to illustrate in the drawings.

In the embodiment of the invention illustrated in Figs. 6 and 7, a conveyor belt 50 is trained about a driving drum 51 and a return idler tensioning drum 52 supported upon a suitable frame 53 for rotation about parallel axes. The drum 51 is driven by a motor 54 in any suitable manner as by a chain 55 and sprockets 56, 57. The drum 52 is mounted for rotation on a wheeled tension carriage 58 movable along the frame 53, and a cable 59 may be provided to connect the carriage to tension means, such as a weight for urging the carriage along the frame to tension the belt.

The upper reach 61 of the belt 50 extends directly in a generally horizontal direction from drum 52 to drum 51 and is supported at intervals therebetween by troughing rollers 62 of usual construction. The lower or return reach 63 of the belt is located entirely beneath the upper or load-carrying reach 61 thereof and a great extent of this reach is supported at regular intervals by troughing rollers 64 so as to be useful in conveying material. Cylindrical idler rollers 65, 66 are provided at opposite ends of the group of troughing rollers 64 for supporting the ends of the return reach of the belt beyond the troughed portion in flattened form. These idler rollers 65, 66 are spaced from the drums 51, 52 respectively by a sufficient amount to permit a 180° twist of the belt therebetween. For example between drum 51 and idler roller 65 the belt is provided with a 180° twist 70, the twist being in a right hand direction or clockwise as seen when looking from drum 51 toward drum 52. At the center of this twisted span, as seen in Fig. 7 the belt will be standing on edge and while such twisting of the belt tensions the opposite margins 71, 72 of the belt due to the fact that a medial line of the belt is undistorted while the margins assume helical positions thereabout, an additional tension is applied to the margin 72 due to the weight of the belt between drum 51 and pulley 65 being supported by tensioning of the margin 72 with the belt in an on-edge position.

Between pulley 66 and idler pulley 67 the belt is again twisted through an angle of 180° in the same direction, that is clockwise as seen looking from drum 51 toward drum 52. Here again the on-edge position introduces additional tensioning in the lowermost margin of the belt, but this time the margin 71 is lowermost and is tensioned the most. It will be seen therefore that when both twists are in the same direction i.e. both clockwise or both counterclockwise, the total tensions on opposite margins of the belt throughout the extent of the belt are equal and excessive tensioning of one margin of the belt and consequent permanent distortion of the belt tending to cause the belt to run crooked is avoided.

In both the embodiment of Figs. 1 to 4 and the embodiment of Figs. 6 and 7 the return reaches of the belt are directly below the upper load-carrying reach and may be supported by troughing rollers and employed throughout a portion thereof for carrying material and the same face of the belt is used for carrying material both in the load-carrying reach and in the return reach.

The tension means, such as the weight-operated carriage 22 of Fig. 1 or the similar carriage 58 of Fig. 7 provides for constantly tensioning the belt. In practicing the invention, I have found it desirable to apply sufficient tension to the belt to hold the central portion of the twisted zone of the belt under slight tension as this assists the belt in forming smoothly formed twists without buckling.

Variations may be made without departing from the scope of the invention as it is defined by the following claim.

I claim:

Bulk material conveyor apparatus comprising a pair of longitudinal laterally-spaced parallel conveyor frame members, an upper tier of transversely bowed troughing idler pulleys on said frame members, the troughing pulleys of said upper tier being spaced apart lengthwise of the frame members and bridging transversely from one frame member to the other parallel each other, a lower tier of idler pulleys spaced apart lengthwise of the frame members and bridging transversely from one frame member to the other parallel each other, a head pulley rotatable between and supported by said frame members at one end thereof, a tail pulley rotatable between and supported by said frame members at the opposite ends of said frame members with said upper and lower tier of idler pulleys between the head pulley and the tail pulley, an endless flat bulk material conveyor belt having many fabric reinforcing plies and a surrounding rubber cover trained longitudinally of said frame members endlessly around said head pulley and said tail pulley, said conveyor belt having an upper load-carrying reach extending from said head pulley to said tail pulley and supported by said upper tier of troughing idlers intermediate said head and said tail pulleys, and the belt being transversely flexible to conform to the bowed contour of said troughing idlers to form a trough for material carried on the belt, the belt having a clean surface directly contacting said idlers and pulleys and a dirty side on which material in said trough region is deposited, the conveyor belt further having a lower return reach below said load-carrying reach extending from said head pulley to said tail pulley and supported by said lower tier of idlers intermediate said head and said tail pulleys, a first roller of substantially greater diameter than said lower tier idler pulleys mounted transversely on said frame in spaced longitudinal relation from said head pulley, the portion of the return reach of the belt between said tail pulley and said first roller being longitudinally twisted 180° about the central axis of the belt and below the load-carrying reach, said first roller engaging the clean side of the belt to define the forward terminus of said twisted portion whereby the surfaces of the belt are inverted as the belt enters the return reach thereof and said clean side of the belt is presented to said lower tier of idlers, a pair of spaced-apart second rollers each of substantially greater diameter than said lower tier idler pulleys mounted transversely between said frame members, both said second rollers being located between said lower tier of idlers and said tail pulley with one of said second rollers adjacent said tail pulley and with the end portion of the return reach extending between said second rollers, the portion of the return reach extending between said second rollers being longitudinally twisted 180° about the central axis of the belt so that each said second roller engages the clean side of the belt to define the opposite termini of the latter twisted portion, both said twisted portions having edge portions of generally helical configuration in the same direction and said belt being stretchable longitudinally at the edge regions to conform to said configuration, means for mounting the tail pulley for movement longitudinally of the belt parallel said head pulley, said means including means biasing said tail pulley away from the head pulley to dampen tension fluctuations in said belt, and a drive unit for rotating said head pulley in a direction to pull said upper load-carrying reach toward said head pulley and said lower reach upward around said tail pulley, said upper load-carrying reach passing progressively over said head pulley and being progressively twisted to invert its faces by said first roller as it enters the return reach and then further twisted in the same direction to reinvert its faces as it exits from the return reach.

References Cited in the file of this patent

UNITED STATES PATENTS

| | | |
|---|---|---|
| 476,787 | Dale | June 14, 1892 |
| 496,496 | Wolff | May 2, 1893 |
| 1,863,562 | Cannon | June 21, 1932 |
| 2,293,977 | Hoffstetter | Aug. 25, 1942 |
| 2,310,819 | Van Orden | Feb. 9, 1943 |
| 2,580,229 | Kendall | Dec. 25, 1951 |
| 2,669,339 | Hansen | Feb. 16, 1954 |

FOREIGN PATENTS

| | | |
|---|---|---|
| 832,032 | France | June 20, 1938 |